(12) United States Patent
Guthrie

(10) Patent No.: US 7,777,725 B2
(45) Date of Patent: Aug. 17, 2010

(54) SYSTEM AND METHOD FOR ASSOCIATING CHARACTERS TO KEYS IN A KEYPAD IN AN ELECTRONIC DEVICE

(75) Inventor: Martin George Albert Guthrie, Moffat (CA)

(73) Assignee: Research in Motion Limited, Waterloo, Ontario (CA)

( * ) Notice: Subject to any disclaimer, the term of this patent is extended or adjusted under 35 U.S.C. 154(b) by 693 days.

(21) Appl. No.: 11/357,201

(22) Filed: Feb. 21, 2006

(65) Prior Publication Data

US 2007/0195062 A1  Aug. 23, 2007

(51) Int. Cl.
*G06F 3/02* (2006.01)
*G09G 5/00* (2006.01)
(52) U.S. Cl. ...................... 345/168; 345/156
(58) Field of Classification Search .......... 345/156, 345/168–172
See application file for complete search history.

(56) References Cited

U.S. PATENT DOCUMENTS 4,333,097 A   6/1982  Buric et al.
5,128,672 A   7/1992  Kaehler
6,204,848 B1  3/2001  Nowlan et al.
6,307,549 B1  10/2001 King et al.
6,789,967 B1 * 9/2004  Forester ...................... 400/489
2002/0097227 A1 7/2002 Chu et al.

FOREIGN PATENT DOCUMENTS

JP   59-99536 A   10/1984

* cited by examiner

*Primary Examiner*—Srilakshmi K Kumar
(74) *Attorney, Agent, or Firm*—McCarthy Tétrault LLP

(57) ABSTRACT

The disclosure relates to a system and method of mapping a layout of a keyboard onto a keypad in an electronic device. The method comprising steps of: providing a definition of a map of a keyboard layout as a collection of segments of the keyboard layout; associating a set of characters in one segment of the segments to programmable keys in the keypad; and selectively associating the programmable keys with another set of characters in another segment of the segments based on a signal received from a navigation system. The system is embodied in an electronic device, including a wireless device.

19 Claims, 9 Drawing Sheets

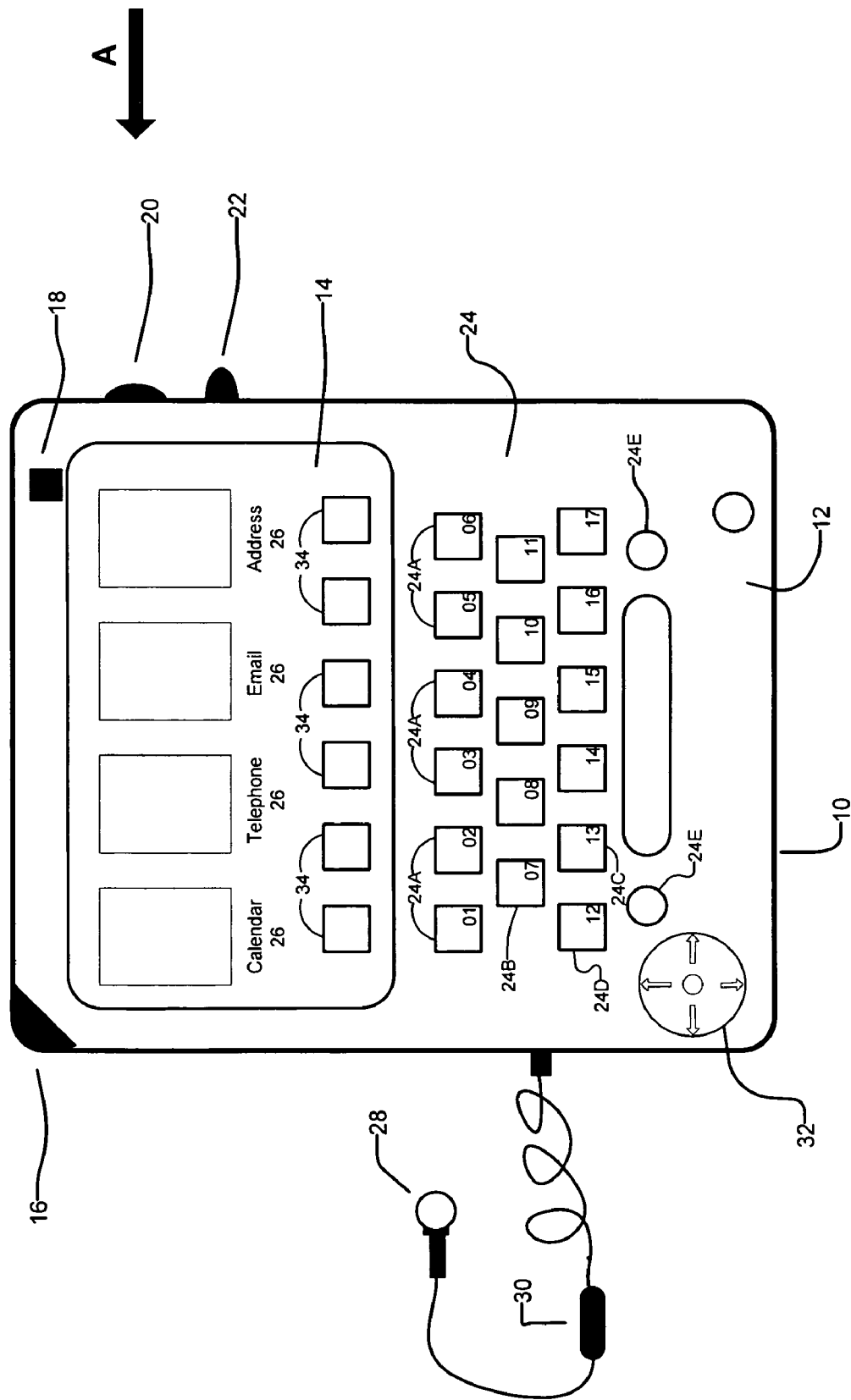

SYSTEM AND METHOD FOR ASSOCIATING CHARACTERS TO KEYS IN A KEYPAD IN AN ELECTRONIC DEVICE

FIELD OF THE INVENTION

The invention described herein relates to a system and method for associating characters to keys on a keypad of an electronic device, such as a handheld communication device. In particular, the invention described herein relates to dynamically mapping a portion of a full keypad to a set of keys on a keypad.

BACKGROUND OF THE INVENTION

Mobile telephonic devices (MTD) such as cell phones and phone-enabled Personal Digital Assistants (PDAs) are connected to a wireless network where one or more such devices communicate voice or data to each other or to external services. Services can include making external phone calls to land-line voice networks, making phone calls to other cell phones, leaving or retrieving voice mail messages or exchanging data messages, such as e-mails, text messages, pages and others. Such devices send and receive a variety of communications in a variety of formats. Such devices can also track appointments and store electronic notes. All of the communications, appointments and notes are logged within the device. Text is entered into the device by a user through a keypad.

There is a tendency for such devices to provide more features and larger displays in smaller form factors. As such, available real estate shrinks for other needed elements, such as the keypad or a keyboard. Some devices have only a numeric keypad or a keypad which does not provide a full complement of keys for a QWERTY-styled keyboard layout. There is a need to provide access to a larger set of keys for such keypads.

As such, there is a need to address deficiencies in the prior art.

BRIEF DESCRIPTION OF THE DRAWINGS

The invention will now be described, by way of example only, with reference to the accompanying drawings, in which:

FIG. 4 is a schematic representation of another device having another keypad and a keypad mapping system using the mapping of FIG. 3, all according to an embodiment;

DETAILED DESCRIPTION OF AN EMBODIMENT

Figure 1:
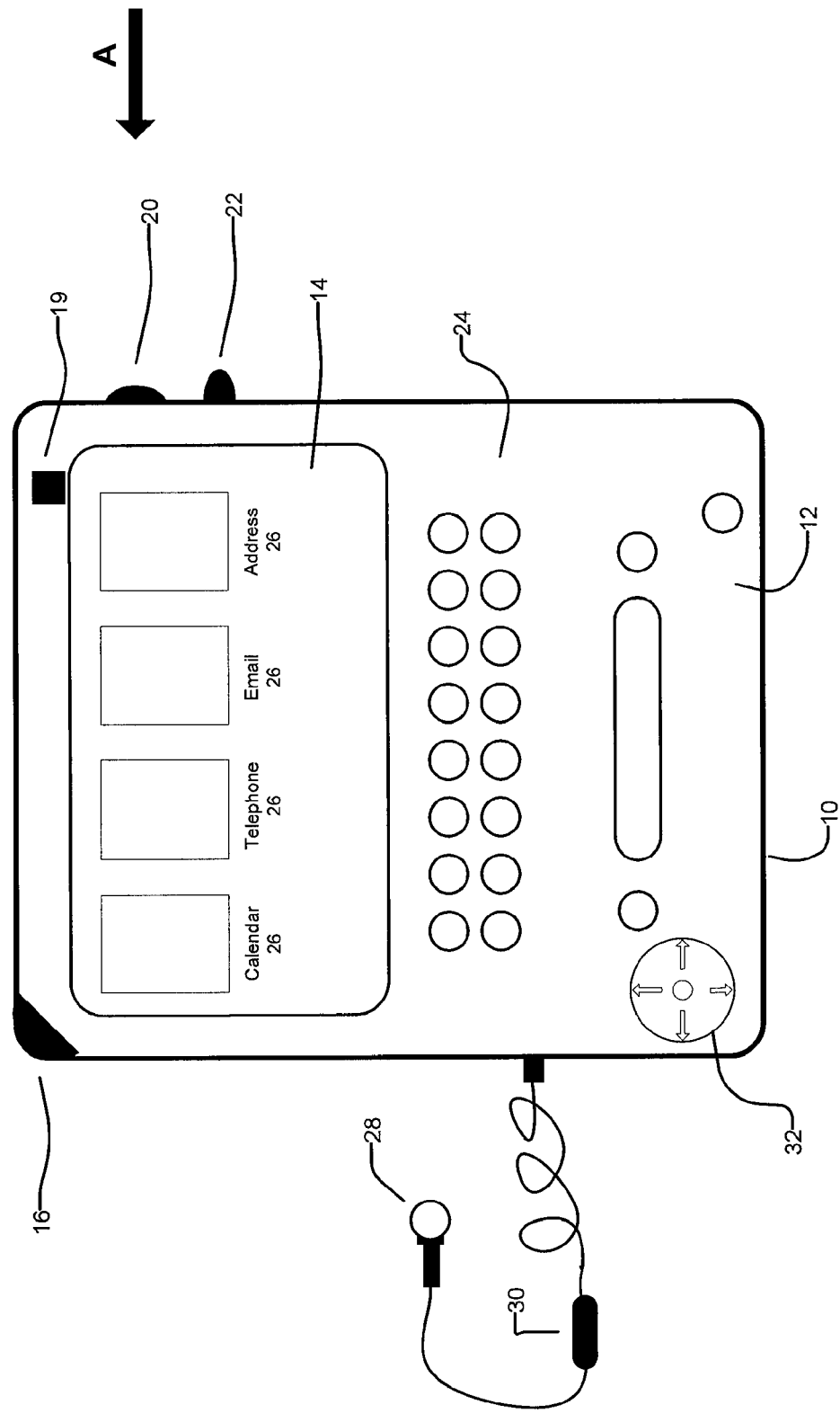
FIG. 1 is a schematic representation of an electronic device having a keypad and a keypad mapping system in accordance with an embodiment.

The description which follows and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect of an embodiment, a method of mapping a layout of a keyboard onto a keypad in an electronic device is provided. The method comprises steps of: providing a definition of a map of a keyboard layout through a collection of segments of the keyboard layout; associating a set of characters in one of the segments to programmable keys in the keypad; and selectively associating the programmable keys with another set of characters in another segment based on a signal received from a navigation system.

In the method, the navigation system may utilize input signals provided from at least one key in the device.

In the method, in one segment one key of the programmable keys may be simultaneously associated with at least two characters. The method further comprises selecting one of those characters by disambiguating a word currently being entered that includes either character.

In the method, a set of icons may be generated on a display in the device identifying the set of characters. Further, in the method an alternative set of characters may be associated with the programmable keys when an alternative layout key is activated.

In the method, an alternative set of icons may be generated on a display in the device identifying the set alternative of characters when the alternative layout key is activated.

In the method, the navigation system may provide wrapping of segments to non-adjacent segments that are located at edges of the map.

In a second aspect, an electronic device is provided, comprising: a keypad; data identifying segments collectively mapping a keyboard layout; a programmable keys in the keypad; and a mapping module system. The mapping module selectively associates characters in one segment to the programmable keys based on inputs provided to a navigation system.

In the device, the navigation system may utilize input signals provided from a key in the device.

In the device, in one segment one of the programmable keys may be simultaneously associated with at least two characters. Therein, an arbitrator module may select a character from the two characters by disambiguating a word currently being entered that includes either character.

In the device as claimed a set of icons may be generated on a display in the device identifying the set of characters.

In the device, an alternative set of characters may be associated with the programmable keys when an alternative layout key is activated.

In the device, an alternative set of icons may be generated on the display in the device identifying the set alternative of characters when the alternative layout key is activated.

In other aspects, combinations of sets and subsets of the above noted aspects are provided.

Referring to FIG. 1, an electronic device for receiving electronic communications, in accordance with an embodiment of the invention is indicated generally at 10. In the present embodiment, electronic device 10 is based on a computing platform having functionality of an enhanced personal digital assistant with cellphone and e-mail features. It is, however, to be understood that electronic device 10 can be based on construction, design and functions of other electronic devices, such as smart telephones, desktop computers pagers or laptops having telephony equipment. In a present embodiment, electronic device 10 includes, a housing 12, which frames an LCD display 14, a speaker 16, an LED indicator 19, a trackwheel 20, an exit key 22, keypad 24 and a telephone headset comprised of an ear bud 28 and a microphone 30. Trackwheel 20 and exit key 22 can be inwardly depressed along the path of arrow "A" as a means to provide additional user-input. Keypad 24 is shown as a matrix of two rows of keys with each row having eight keys. This arrangement of keys has a complement of keys that is smaller than the standard "QWERTY"keyboard. As such, in order to provide the full complement of QWERTY keys, some form of mapping of keys from the QWERTY layout to the layout of keypad 24 is required. Further detail is provided on this mapping below. Directional key 32 is a "rocker"-type key that has a center rest position and can be tilted or moved from its rest position in one of several directions (e.g. up, down, left or right, when viewing the front of device 10) to activate a programmed function associated with the direction of activation. A joystick or a rollerball input device can also be used instead or in addition to key 32.

Various applications are provided on device 10, including email, telephone, calendar and address book applications. A graphical user interface (GUI) to activate these applications is provided on display 14 through a series of icons 26. Shown are calendar icon 26, telephone icon 26, email icon 26 and address book icon 26. Such applications can be selected and activated using the keypad 24 and/or the trackwheel 20. Further detail on selected applications is provided below.

It will be understood that housing 12 can be made from any suitable material as will occur to those of skill in the art. Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and many forms of 802.11 wireless broadband, like 802.11a, 802.11b, 802.11 g, etc. that can support voice. Other embodiments include Voice over IP (VoIP) type streaming data communications that can simulate circuit switched phone calls. Ear bud 28 can be used to listen to phone calls and other sound messages and microphone 30 can be used to speak into and input sound messages to device 10.

Figure 2:
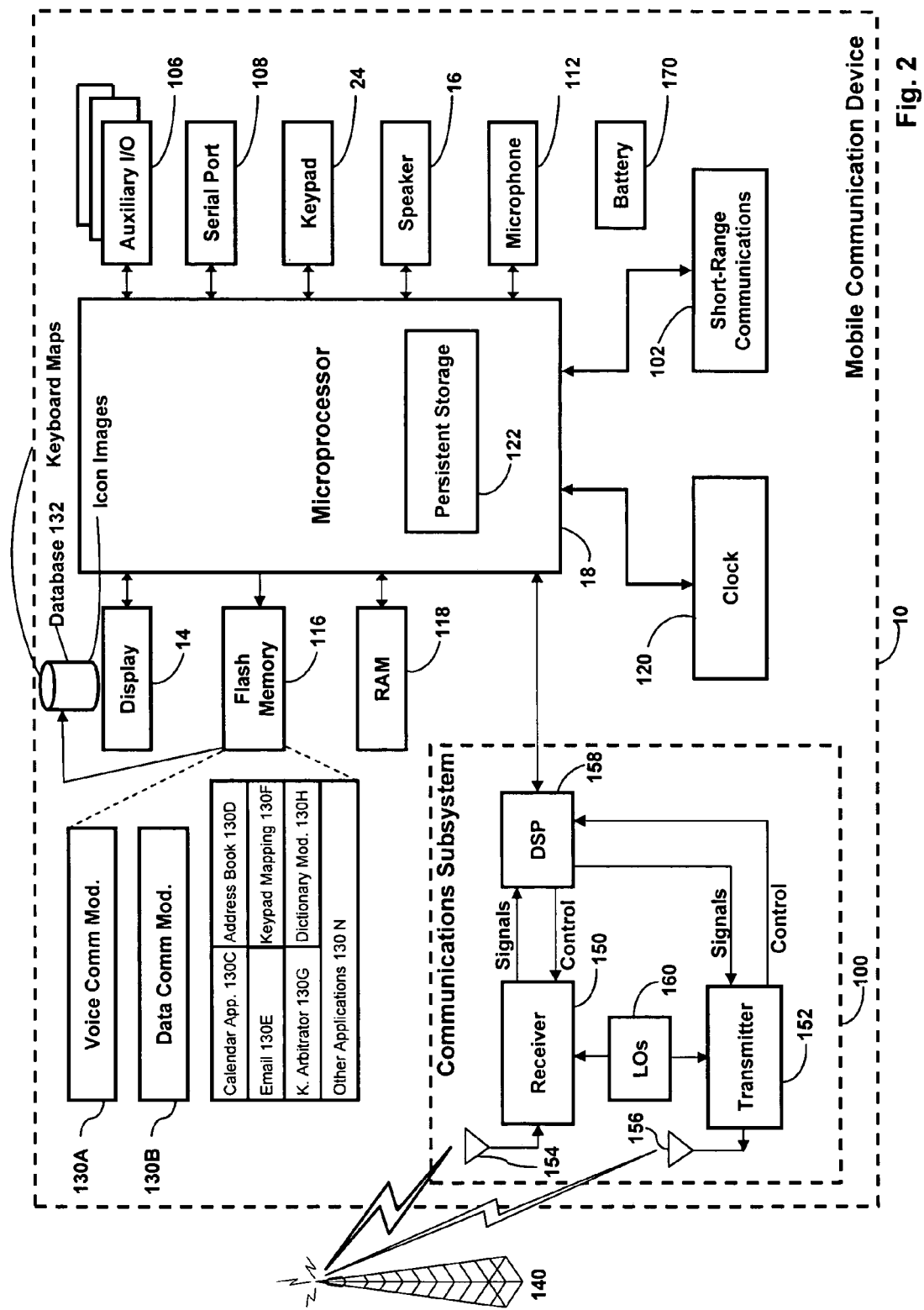
FIG. 2 is a block diagram of internal components within the device of FIG. 1.

Referring to FIG. 2, functional elements of device 10 are provided. The functional elements are generally electronic or electro-mechanical devices. In particular, microprocessor 18 is provided to control and receive almost all data, transmissions, inputs and outputs related to device 10. Microprocessor 18 is shown schematically as coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950 ™ series microprocessors and the 6200 series microprocessors, all available from Intel Corporation.

In addition to the microprocessor 18, other internal devices of the device 10 include: a communication subsystem 100; a short-range communication subsystem 102; keypad 24; and display 14; with other input/output devices including a set of auxiliary I/O devices 106, a serial port 108, a speaker 16 and a microphone port 112 for microphone 30; as well as memory devices including a flash memory 116 (which provides persistent storage of data) and random access memory (RAM) 118; clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile storage medium, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter.

Communication functions, including data and voice communications, are performed through the communication subsystem 100 and the short-range communication subsystem 102. Collectively, subsystem 102 and subsystem 100 provide the signal-level interface for all communication technologies processed by device 10. Various other applications 130 provide the operational controls to further process and log the communications. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Communication subsystem 100 provides device 10 with the capability of communicating with other devices using various communication technologies, including instant messaging (IM) systems, text messaging (TM) systems and short message service (SMS) systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode a received signal, such as a text message or web page download, is processed by the communication subsystem 100 and is provided as an input to microprocessor 18. The received signal is then further processed by microprocessor 18 which can then generate an output to the display 14 or to an auxiliary I/O device 106. A user may also compose data items, such as e-mail messages, using keypad 24, a thumbwheel associated with keypad 24, and/or some other auxiliary I/O device 106, such as a touchpad, a rocker key, a separate thumbwheel or some other input device. The composed data items may then be transmitted over communication network 140 via communication subsystem 100.

In a voice communication mode, overall operation of device 10 is substantially similar to the data communication mode, except that received signals are output to speaker 16, and signals for transmission are generated by microphone 30. Alternative voice or audio I/O subsystems, such as a voice message recording subsystem, may also be implemented on device 10.

Short-range communication subsystem 102 enables communication between device 10 and other proximate systems or devices, which need not necessarily be similar devices. For example, the short-range communication subsystem may include an infrared device and associated circuits and components, or a Bluetooth™ communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by internal software applications.

Additional applications include calendar 130C which tracks appointments and other status matters relating to the user and device 10. Calendar 130C is activated by activation of calendar icon 26 on display 14 (FIG. 1). It provides a daily/weekly/month electronic schedule of appointments, meetings and events entered by the user. Calendar 130C tracks time and day data for device 10 using processor 18 and internal clock 120. The schedule contains data relating to the current accessibility of the user. For example it can indicate when the user is busy, not busy, available or not available. In use, calendar 130C generates input screens on device 10 prompting the user to input scheduled events through keypad 24. Alternatively, notification for scheduled events could be received via an encoded signal in a received communication, such as an e-mail, SMS message or voicemail message. Once the data relating to the event is entered, calendar 130C stores processes information relating to the event; generates data relating to the event; and stores the data in memory in device 10.

Address book 130D enables device 10 to store contact information for persons and organizations. Address book 130D is activated by activation of address book icon 26 on display 14 (FIG. 1). In particular, name, address, telephone numbers, e-mail addresses, cellphone numbers and other contact information is stored. The data can be entered through keypad 24 and is stored in non-volatile memory, such as persistent storage 122 in device 10 in a database.

Email application 130E provides modules to allow user of device 10 to generate email messages on device 10 and send them to their addressees. Application 130E also provides a GUI which provides a historical list of emails received, drafted, saved and sent. Text for emails can be entered through keypad 24. Email application 130E is activated by activation of email icon 26 on display 14 (FIG. 1).

Key mapping module 130F is a module that recognizes when a key on keypad 24 is activated and generates a signal for a character currently associated with that key based on a current mapping scheme. The signal for the character may be used to generate that character on display 14. The signal may be used to alternatively or additionally activate a command for the software operating on device 10. Key mapping module 130F is connected to the outputs of keypad 24 and is able to read its signals. Generally, mapping module 130F operates continuously in the background of device 10.

Keypad arbitrator module 130G is a module that disambiguates a keypad entry when a key is entered and there are two or more possible characters that can be generated for it at that time. Dictionary module 130H provides word comparison routines to check alternative possibilities for words when there is an ambiguity as they are being entered through keypad 24. Further descriptions on modules 130G and 130H are provided below.

Other applications and modules may be provided in a combination of hardware and software for device 10 and are shown figuratively as applications 130N.

Figure 3:
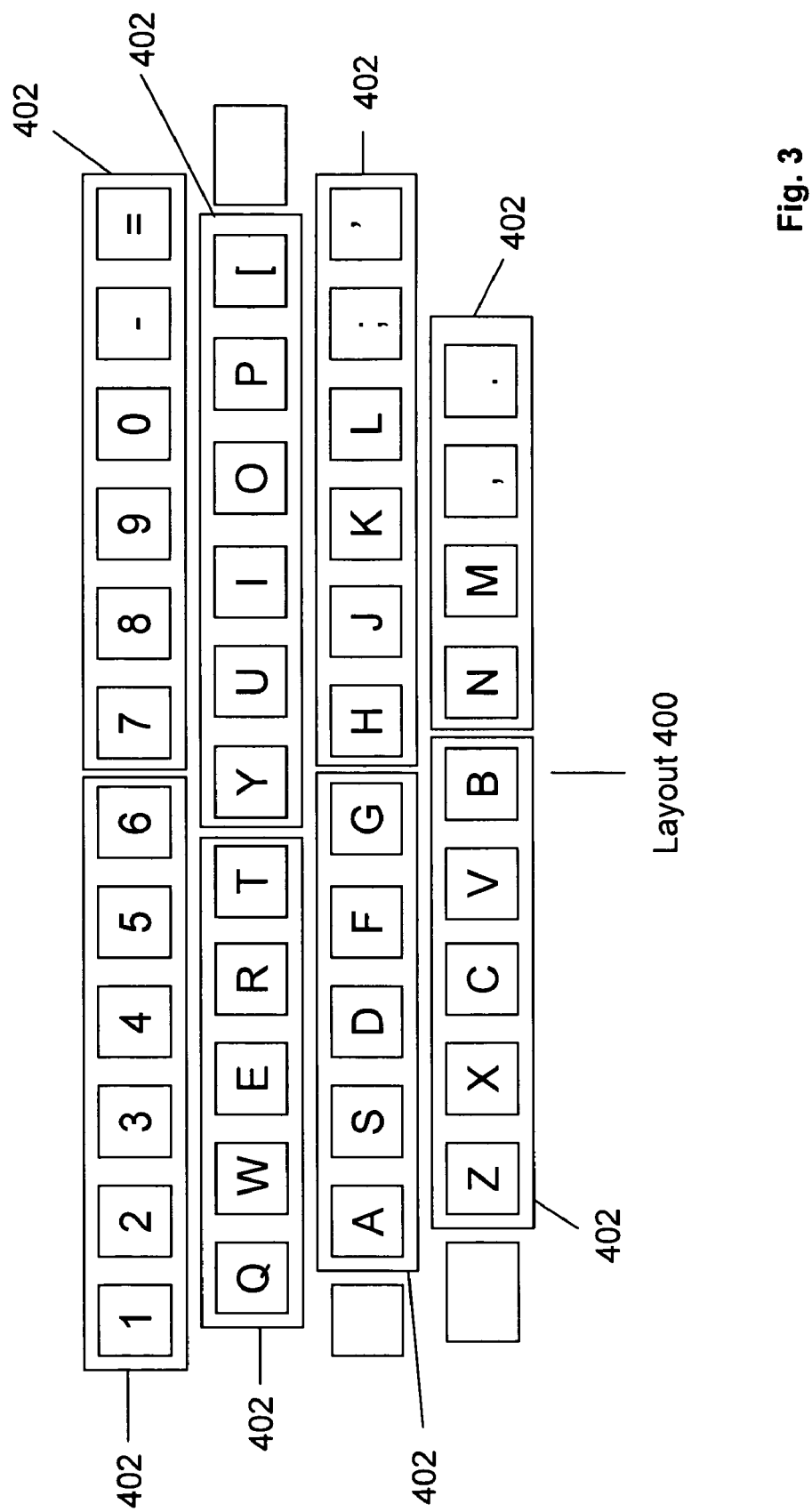
FIG. 3 is a schematic representation of a mapping layout of full-sized keypad used by an embodiment.

Referring to FIGS. 3 and 4 further details on an embodiment are provided. Generally, the embodiment provides a system and method of mapping a segment of a keyboard layout onto a programmable set of keys in a device associated with the embodiment. A different segment of the keyboard layout is mapped to the programmable keys based on signals received by a keyboard map navigation system. As such, a specific programmable key can be associated with different keys within the keyboard layout, depending on what segment is currently being mapped on the programmable keys. The embodiment utilizes the set of programmable keys, keyboard layout map and navigation system.

Referring first to FIG. 3, details on a map for keyboard layout is provided. The map is used by an embodiment to determine how to assign characters to the designated programmable keys. For illustrative purposes of an embodiment, a conventional QWERTY keyboard layout 400 is shown. Other mappings can be provided for other layouts (e.g. numeric only, Dvorak layout etc.). For the map, layout 400 is divided into a series of segments 402, where each segment 402 comprises a set of keys. Preferably, the cumulative set of segments 402 represent the full set of keys in layout 400. It is preferable that each segment contain a continuous set of keys, with no internal gaps of keys among the keys. Segment may comprise a grid of keys and the programmable keys map to the grid. Each segment does not necessarily have to have the same dimensions as the other segments. For example, one segment may have one row of seven keys and its adjacent segment may comprise two rows of four and five keys. Adjacent segments may have over-lapping keys repeated in each segment. It will be appreciated that there are consistency benefits if the dimensions are the same for all or most segments 402. The definition of the segments 402 are stored as data by the embodiment.

Segments 402 can be comprised of any dimension of keys. As shown for layout 400, segments 402 are each defined as a single row of keys, e.g.

| | |
|---|---|
| Segment 1 comprises keys | Q W E R T |
| Segment 2 comprises keys | Y U I O P |
| Segment 3 comprises keys | A S D F G |
| Segment 4 comprises keys | H J K L ; ' |
| Segment 5 comprises keys | Z X C V B |
| Segment 6 comprises keys | N M , . ? |

Other segments for the full layout are not shown. Segments 402 are defined to represent two columns of five keys, with each column divided into three rows. Other dimensions of rows and columns can be used.

It will be appreciated that for a given keyboard layout 400, there may be alternative characters which may be assigned to specific keys for a given segment. For example, in layout 400 the alphabetic characters can have a lowercase and an uppercase character. A specific case is generated depending on whether the state of the "shift" key. The "shift" key provides an alternative layout for layout 400. Additional characters may be accessed by activating another alternative layout key, such as a "alt", "ctrl", "open-apple" or "window" key. The embodiment is able to recognize when an alternative layout key is activated and to change a value of a character for a programmable key accordingly.

Referring now to FIG. 4, device 10 is similar to device 10 of FIG. 1, but has a different layout for keypad 24. The internal components for device 10 are comparable to the components noted in FIG. 2 for device 10 of FIG. 1. For the purpose of the following description and the embodiment, the devices shown in FIGS. 1 and 4 are equivalent (but for differences in the keyboard layouts), unless otherwise noted.

Keypad 24 is shown as having seventeen keys 24 in three rows. Keys 24 are sequentially numbered 01 to 17 in a left to right order for convenience of reference. Additionally, each key 24 may be silk-screened with a character, a number or a combination of characters to distinguish it from other keys.

As assignments for the programmable keys change, the values of the icons change accordingly. Further, if an alternative layout key is activated (e.g. "shift"), then the icons will change as well.

In order to ultimately map the entire (or most of) keyboard layout 400 through the set of programmable keys, initially one segment 402 of keys is mapped onto the programmable keys 24A (labelled as keys "01" to "06") in device 10 of FIG. 3. Subsequently, other segments can be mapped onto the programmable keys using the navigation system. As such, the embodiment provides a snapshot of the full set of keys in layout 400 through keys 24A and the snapshot can be changed to a different segment 402 in layout 400 using inputs provided via the navigation system. On initiation of device 10, a default keyboard layout may be selected and a default starting segment 402 may be initially assigned to keys 24A.

In exemplary use, initially the individual characters in Segment 3 (characters A, S, D, F, and G) are individually assigned to keys 01 through 05. Activation of key 01 will generate an "A" character. For the present example, key 06 is not assigned to any key in the Segment. If an alternative layout key is activated (e.g. a "shift" key), then the character may change accordingly.

In order to navigate through the layout 400, navigation system uses keys 24B, 24C, 24D and 24E navigate through the segments of layout 400. Key 24B is an "up" direction key; key 24C is a "down" direction key; key 24D is a "right" direction key; and key 24E is a "left" direction key. Keys 24B, 24C, 24D and 24E are preferably arranged in a layout relative to each other that implies the direction for each key. As show, keys 24B, 24C, 24D and 24E are arranged in a diamond layout, with "up" key 24B being at the top point of the diamond layout. As such, if the current segment is Segment 3, using the navigation system, if "up" direction key 24B is activated, then programmable keys 24A are mapped to the characters in Segment 1, located immediately above Segment 3. Similarly, if "down" direction key 24E is activated, then the characters in Segment 5 would be assigned to keys 24A. Corresponding mappings would be assigned if either "left" or "right" direction keys 24B and 24C are activated. In another navigation system, navigation key 32 may be used. Activating the "up" direction for navigation key 32 has the effect of activating "up" direction key 24B. Alternatively or additionally, a different set of keys in keypad 24 can be assigned to be the navigation keys.

The embodiment may allow for "wrapping" of segment mappings onto programmable keys 24A. Wrapping occurs when a direction key is activated for a current segment that it at an edge of the map and implementation of the direction key would roll off the edge of the map. The subsequent segment would be identified from an appropriate segment that is at another edge in the layout, where that edge has been notionally wrapped to connect to the edge of the current segment.

It will be appreciated that the navigation system described provides a new mapping for programmable keys 24A based on the current mapping and the direction key (24B-E or 32) that is activated. This scheme provides a change in the mapping relative to the current segment being mapped to keys 24A. An absolute remapping scheme can also or alternatively be used wherein for a set of navigation keys, each navigation key is assigned to a particular segment. When a particular navigation key is activated, its associated segment is assigned to the programmable keys. For example, key 24B may be associated with Segment 1 and key 24D may be associated with Segment 3. Activation of those keys will cause keys 24A to be mapped to the associated segments.

To assist the user of device 10 in seeing what segment 402 is currently mapped to programmable keys 24A, device 10 generates icons 34 on display 14 representing the current segment mapped to programmable keys 24A. Icons 34 are preferably generated in a location on display 14 that is near programmable keys 24A in order to connote a close association with each icon 34 to its associated key 24A, e.g. near the bottom of display 14. Each icon displays the current key assigned for the associated programmable key. If an alternative access key is pressed (e.g. the "shift" key), then the icons 32 may change to display the correct character (e.g. either in lowercase or uppercase). For another aid to assist the user each key 24A may be silk screened with all or most of the different possible characters associated with it (either through different segments 402 or alternative access keys).

In one mapping, two or more keys may be assigned to a programmable key. For example, one segment may assign both the "D" and "F" keys to one programmable key 24A. When the user activates that key 24A in that mapping, it will then be necessary to determine which character should be generated. The embodiment disambiguates this situation by conducting an active, on-going spell check as words are entered. When a key 24A is activated and the embodiment recognizes that the key 24A has two or more characters associated with it for the current segment, the embodiment analyzes the alternative characters in the context of the previous characters entered into device 10. A spell check system analyzes the characters as words are being entered character-by-character. When a key having multiple current characters is activated, the spell check builds a set of words based on each of the characters and identifies which word(s) are more (or most) likely the correct word. Additionally, other word disambiguation techniques may be used to persons skilled in the art. Such techniques may include using an algorithm based on SmartType™ systems.

Arbitrator 130G, as shown in FIG. 2, analyses the alternatives presently assigned to the key against previously entered keystrokes to disambiguate the selected value for the key. Word dictionaries 132 in device 10 may be used to evaluate alternate words considered by arbitrator 130G. Further detail on this arbitration is provided later.

Figure 5A:
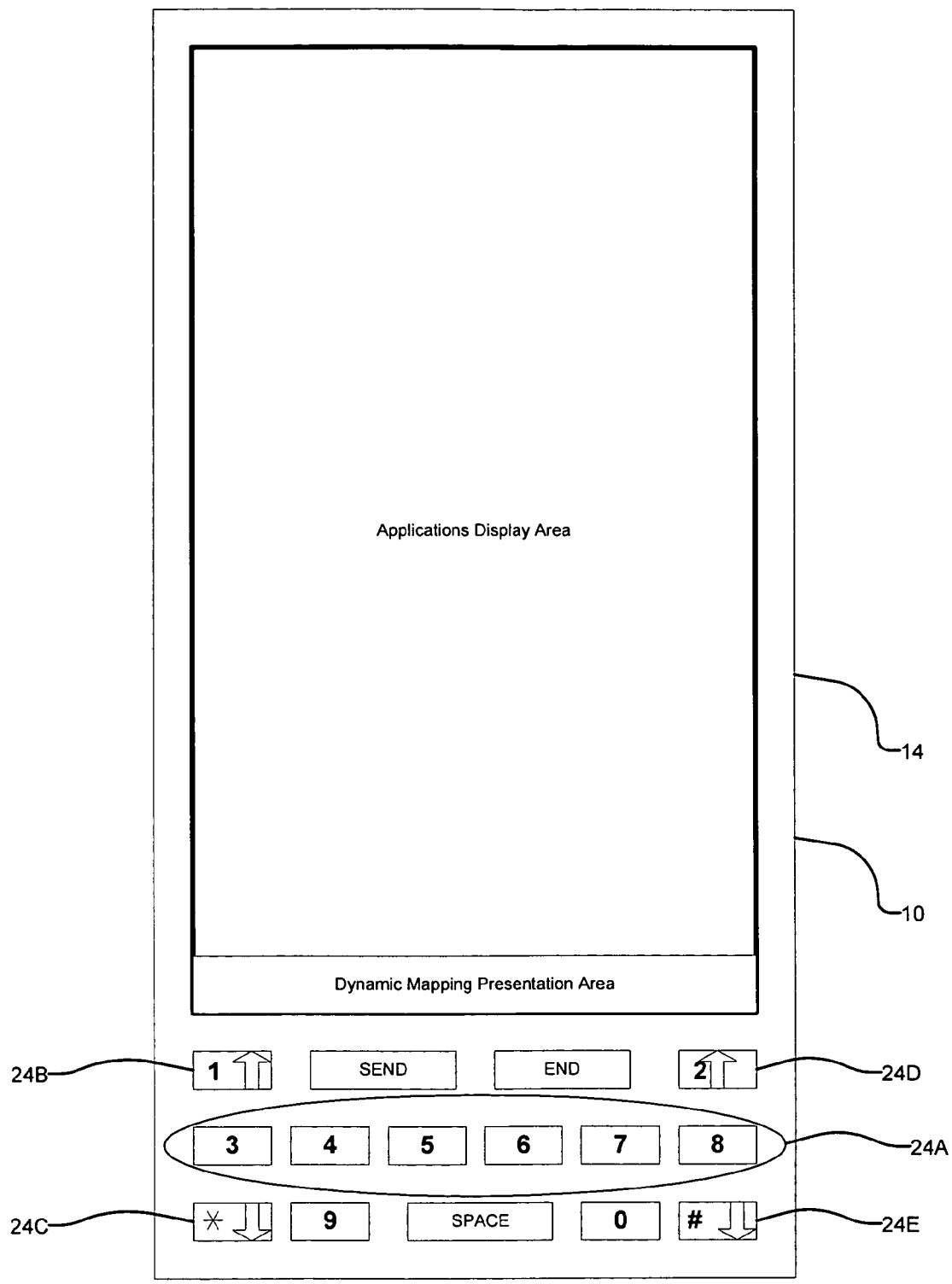
FIG. 5A is a schematic representation of yet another device having yet another keypad and the keyboard mapping system using the mapping of FIG. 3, all according to an embodiment.

Referring to FIGS. 5A-5D and 6, device 10 of FIG. 5A is similar to device 10 of FIGS. 1 and 4, but has a different layout for keypad 24 and a different mapping layout. The internal components for device 10 of FIG. 5A are comparable to the components noted in FIG. 2 for device 10 of FIGS. 1 and 4. For the purpose of the following description and the embodiment, the devices shown in FIGS. 1, 4 and 5A are equivalent (but for differences in the keyboard layouts), unless otherwise noted. In FIG. 5A, device 10 has a further reduced keypad 24, comprising three rows of keys, with the middle row comprising six programmable keys 24A, labelled as 3, 4, 5, 6, 7 and 8.

For device 10 of FIG. 5A, a home row is defined as an initial set of characters for keys 24A and then segments of keys above and below the home row are defined as additional segments.

| Home Row: | A S DF GH JK L: |
|---|---|
| Upper Left Row: | Q W E R T Y |
| Upper Right Row: | U I O P |
| Lower Left Row: | Z X C |
| Lower Right Row: | V B N M . ? |

Figure 5B:
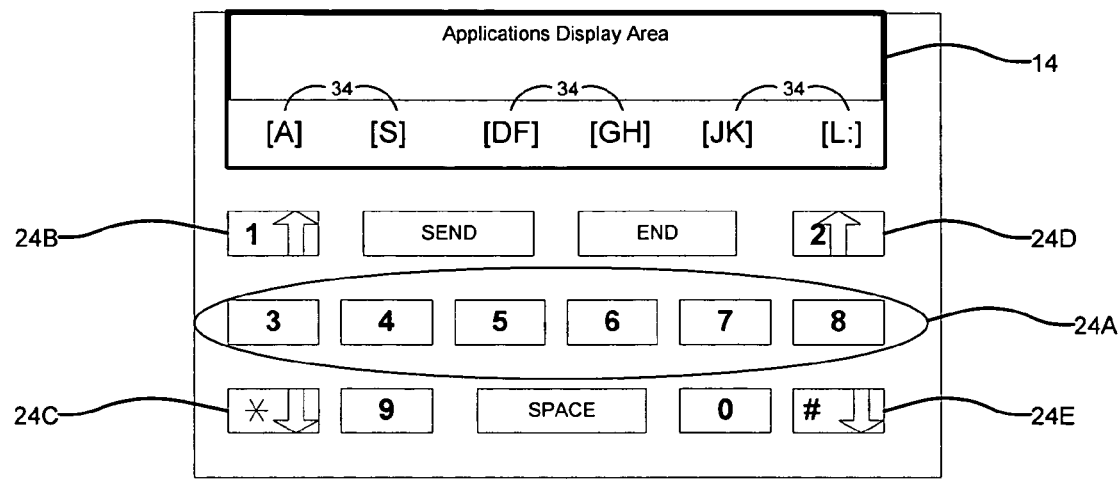
FIG. 5B is a schematic representation of the device of FIG. 5A during operation of the keyboard mapping system.
Figure 5C:
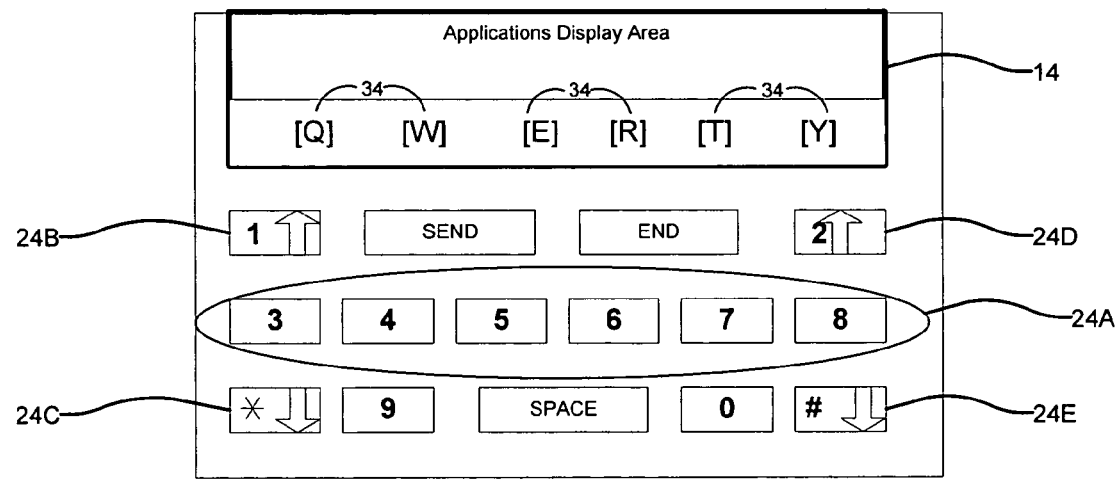
FIG. 5C is a schematic representation of the device of FIG. 5A during operation of the keyboard mapping system after a new map is programmed onto its keypad.

Referring to FIGS. 5A-5C, the navigation system for device 10 of FIG. 5A is similar to the navigation systems described above, except that the direction mapping of keys 24B-D differ from the mapping described for devices 10 in FIGS. 1 and 4. Navigation key 24B is labelled as 1. It is located in the top row at the left end and is used as an up direction key. Navigation key 24C is labelled as *. It is located in the bottom row at the left end and is used as a down direction key. Navigation key 24D is labelled as 2 and is located in the top row at the right end. Navigation key 24E is labelled as # and is located in the bottom row at the right end. Keys 24D and 24E are also used as up and down direction keys, but in different contexts than keys 24B and 24C.

Briefly, using the layout as described for the home row, to begin as a default, keys 24A are programmable to the characters in the long segment. The six programmable keys 24A need to map to the 10 characters. As such, some of the programmable keys 24A are provided with multiple character assignments for the long row. For example, as shown in FIG. 5B:

characters D and F are assigned to key "5";
characters G and H are assigned to key "6";
characters J and K are assigned to key "7"; and
characters L and : are assigned to key "8".

When any key 24A having multiple characters associated with it is activated, a character may be selected among the alternatives using techniques described earlier.

Icons 34 in display 14 show the mappings of the characters to the keys 24A. Subsequent activation of the navigation keys 24B, 24C, 24D and 24E will map keys 24A to different rows.

Figure 5D:
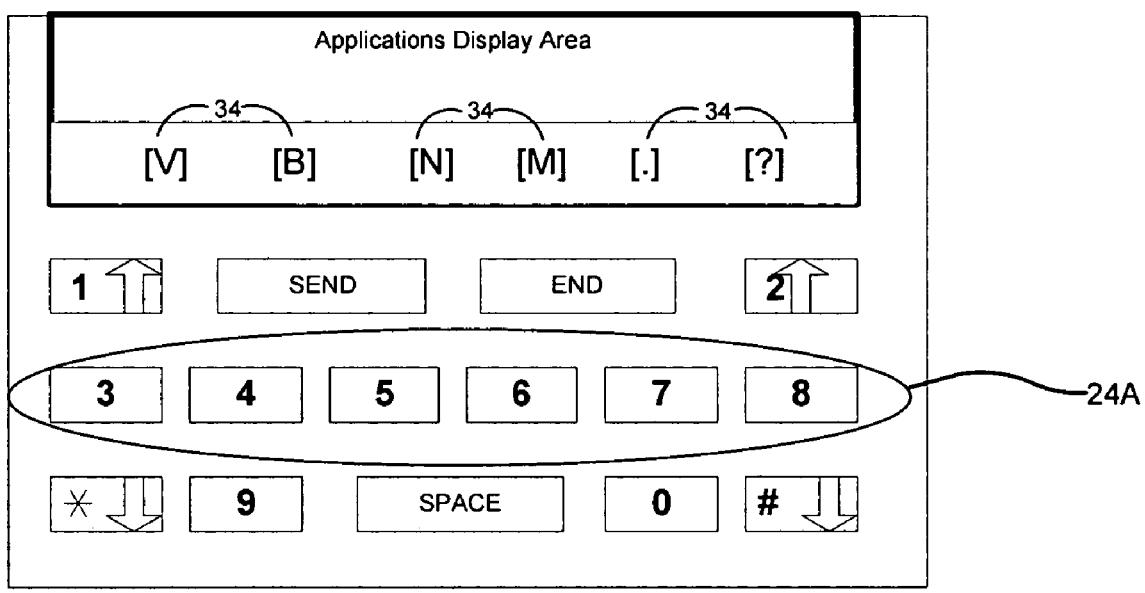
FIG. 5D is a schematic representation of the device of FIG. 5A during operation of the keyboard mapping system after another new map is programmed onto its keypad.

In particular, referring to FIG. 5C, if key 24B is activated from the home row, then keys 24A are mapped to the Upper Left Row keys. Referring to FIG. 5D, if key 24C is activated from the home row, then keys 24A are mapped to the Lower Right Row keys.

Similarly, when the right half of the layout 400 is mapped to keys 24A, the right navigation keys 24D and 24E are used to change the mapping from the current row to another row in the right half according to the navigation keys activated. When the mapping is at the bottom of the right half, i.e. Segment 6, activation of the left down navigation key 24C maps Segment 5 layout 400 onto keys 24A. When the mapping is at the top of the right, i.e. Segment 2, activation of the navigation key 24D maps the Segment 1 onto keys 24A.

It will be appreciated that other navigation assignments can be devised using a different number of navigation keys for other keyboard layouts. For example, an alternative layout for a keyboard divides layout 400 into a left half, comprising Segments 1, 3 and 5 and a right half, comprising Segments 2, 4 and 6. Navigation keys 24B and 24C can be predominantly used when the left half of layout 400 is being accessed and keys 24D and 24E are predominantly used when the right half is being accessed.

Figure 6:
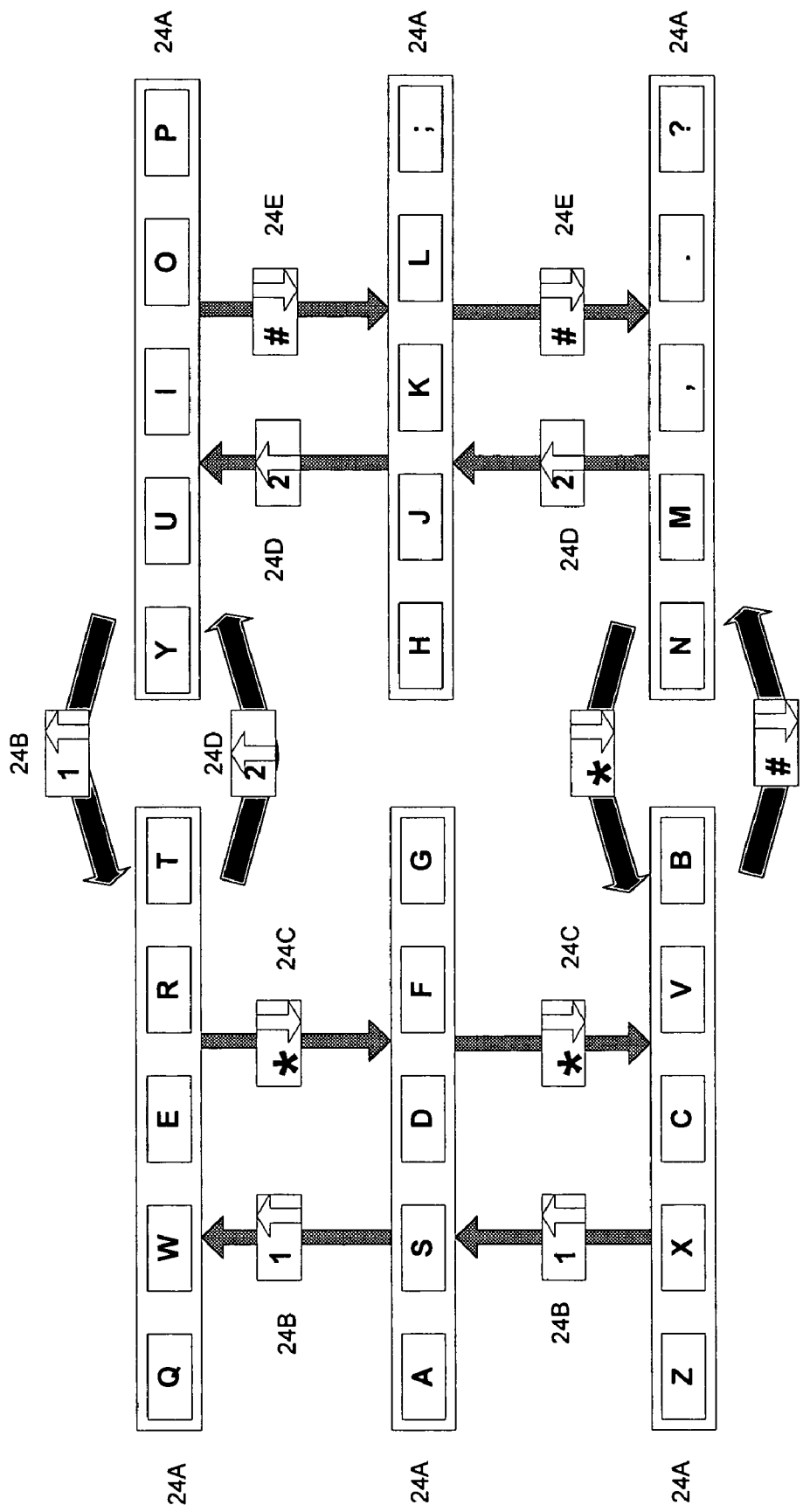
FIG. 6 is a flow chart of an exemplary mapping of characters to the keys of the device of FIG. 5A during operation of the keyboard mapping system using another mapping layout.

Referring to FIG. 6, a flow of changes of assignments of Segments to keys 24A on device is provided for the layout described immediately above, as a user activates different navigations keys. The rows of characters represent segments 402 currently assigned to keys 24A. The arrows between rows indicate the navigation key recently activated and the new segment assigned to keys 24A. For example, when a segment from the left half of the layout is mapped to keys 24A of device 10 of FIG. 5A, the left navigation keys 24B and 24C are used to change the mapping of characters from the current row to another row in the left half by going up and down the left half according to the navigation key activated. When the mapping is at the bottom of the left half, i.e. Segment 5, activation of the right down navigation key 24E maps the bottom segment of the right half of layout 400 onto keys 24A, namely Segment 6. When the mapping is at the top of the left half, i.e. Segment 1, activation of the right up navigation key 24D maps the top segment of the right half of layout 400 onto keys 24A, namely Segment 2.

Figure 7:
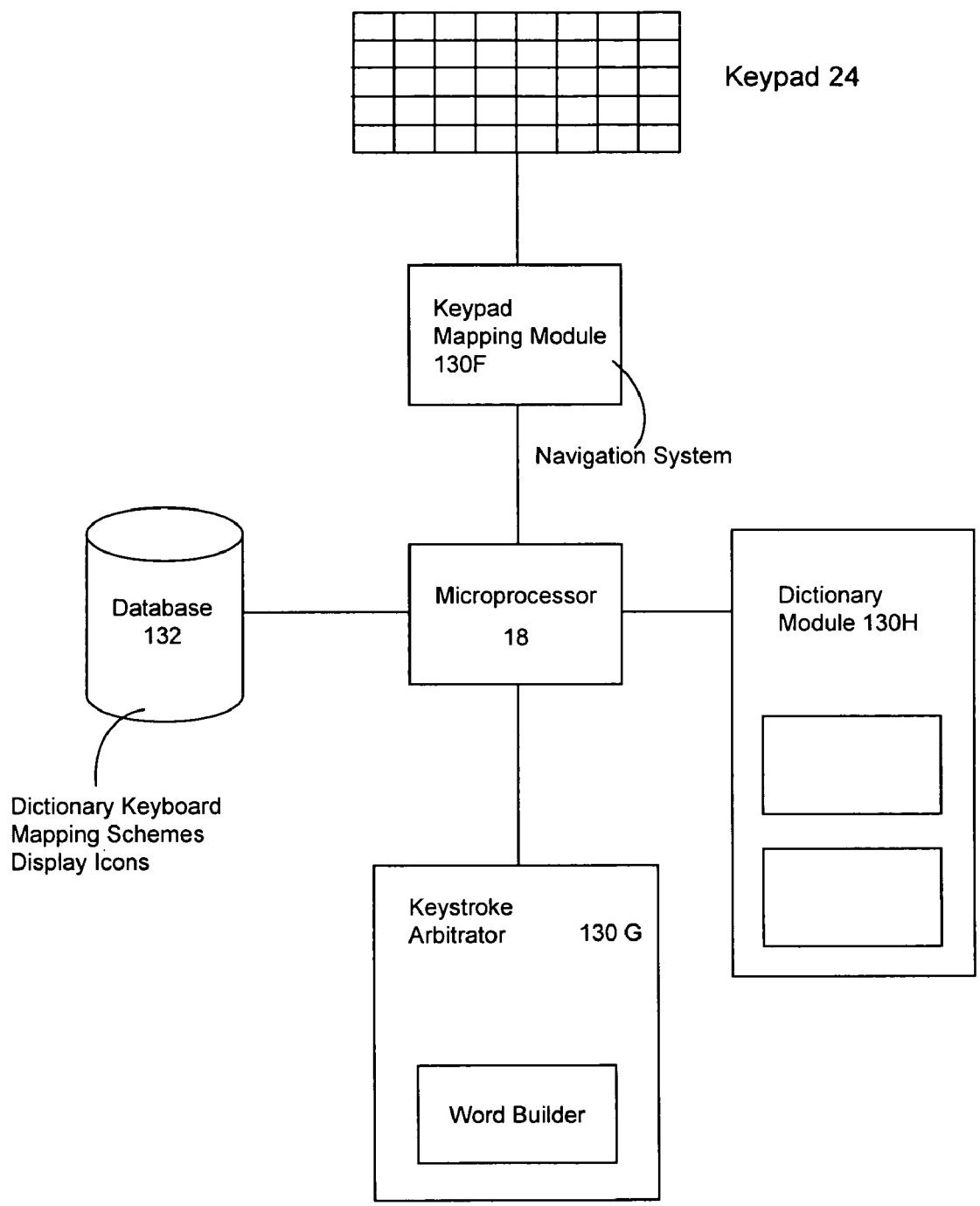
FIG. 7 is a block diagram showing relationships among the keypad, the keypad mapping system, a keystroke arbitrator, a dictionary module, a dictionary in a database and internal components of embodiments of FIGS. 1, 3 and 5A.

Specific relationships of elements of device 10 as collectively previously described are shown in FIG. 7 where microprocessor 18 is in electrical communication with keypad mapping module 130F, arbitrator 130G, dictionary module 130H and database 132. As with other electronic devices, microprocessor 18 executes software to control operation of device 10. Database 132 stores dictionary data used by dictionary module 130H, keyboard mapping schemes, segment schemes, and icons for schemes used by mapping module 130F. There may be more than one map stored in the database.

Keypad mapping module 130G accesses the mapping scheme data and responds to various inputs from the navigation system to control assignment of characters to keys 24A and to generate appropriate key icons 32 on display 14. For the embodiment, module 130G provides the navigation system described earlier. The navigation system recognizes when a predetermined navigation key is activated (e.g. keys 24B-D or key 32), then identifies which next segment 402 should be mapped to keys 24A. These steps may be achieved by having a map of the segments 402 for layout 400 accessible in database 132 and tracking the current location of the current segment 402 that is mapped to keys 24A. Depending on what navigation key is activated, navigation system determines what and when a next segment 402 is mapped to keys 24A. Navigation system may have rules to govern how and when keys 24A are remapped. Module 130G also has a database and a module to generate icons 34 (FIG. 3) on display 14 according to the current segment assigned to the programmable keys.

When a key has multiple characters associated with it for its current mapping, arbitrator 130G is used to select a character from the alternatives. Arbitrator 130G builds words as characters are entered using the different values for the key. Dictionary module 130H can generate queries to database 132 storing a dictionary for words known by the embodiment. The results of the queries are provided to arbitrator 130G. The unselected alternatives are ignored. The selection criteria maybe based on probabilities and/or rankings of the alternatives. Based on the results of the queries, arbitrator 130G selects a character from the alternatives. That character is then generated by the embodiment on display 14 and may be used to initiate other processes on device 10.

Additional information about the embodiment is provided below.

It will be appreciated that keystroke mapping module 130F, arbitrator 130G, dictionary module 130H and other applications in the embodiments can be implemented using known programming techniques, languages and algorithms using any combination of software, firmware and hardware. The titles of the modules are provided as a convenience to provide labels and assign functions to certain modules. It is not required that each module perform only its functions as described above. As such, specific functionalities for each application may be moved between applications or separated into different applications. Different signalling techniques may be used to communicate information between applications using known programming techniques. Known data storage, access and update algorithms allow data to be shared between applications.

Further detail is now provided on how an embodiment determines when a key in keypad 24 is being activated. Activation of a key generally follows a keystroke depress and release cycle of a switch: a key is initially in a rest (unactivated) position, then it is activated by the user by the user pressing down on the key until an activation point is passed, then it is held down for a length of time, and finally, it is released and returns to its rest position. The technology of the keypad determines how a key is activated and what signals are generated. A typical electro-mechanical keypad has a switch which is normally "open" and is depressed to a "closed" position, which then completes an electrical circuit and generates an electrical signal. When the key is released, it returns to its rest position and the circuit become "open" again. For example, when the "a" key is pressed, keypad 24 generates a signal indicating activation of the "a" key and when the "a" key is released, keypad 24 generates another signal indicating the release of key. The signals can be analog or digital signals. Conditions and states of analog signals may be determined from the level of the signal or a transition of the signal from one level to another. The analog signal may also be a pulse signal. All signals are provided to mapping module 130F for further processing.

Keypad technologies may use pressure sensing devices, strain gauges, touch screens, elastomer panels with carbon pucks, electrical switches and other technologies to identify when a key is being activated. Depending on the implementation, a key can be recognized as being activated on the completion of its downstroke (i.e. when it is initially being activated) or the completion of its upstroke (i.e. after the key had been activated and then subsequently has been released). Most applications utilize the downstroke of a key to represent its activation; however, the upstroke may also used. Other signals, such as the time of activation and pressure data for the key may also be provided.

Although the embodiment is described as being related to a portable communication device, it will be appreciated that other embodiments are provided which may not be portable. As long as there is an input device with the potential for having nearly simultaneously or simultaneously activated triggers, features of the embodiments described herein can be applied to resolving any conflicts among input signals received by the input device.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

I claim:

1. A method of mapping a layout of a keyboard onto a keypad in an electronic device, the method comprising steps of:
   providing a definition of a map of a keyboard layout of a QWERTY keyboard layout through a collection of segments of said keyboard layout;
   associating a set of characters in one segment of said segments to programmable keys in said keypad;
   providing a navigation system for moving through said keyboard layout, said navigation system having
      a left set of directional keys providing upper and lower navigation controls for said programmable keys when said set of characters are from a left column of segments in said collection of segments; and
      a right set of directional keys providing upper and lower navigation controls for said programmable keys when said set of characters are from a right column of segments in said collection of segments; and
   associating said programmable keys with another set of characters in another segment of said segments based on a signal received from said navigation system,
   wherein said collection of segments define rows having said left and right columns of segments of said QWERTY keyboard layout.

2. The method of mapping a layout of a keyboard onto a keypad in an electronic device as claimed in claim 1, wherein said navigation system comprises a plurality of navigation inputs providing at least three directions from said set of characters to identify said another set of characters.

3. The method of mapping a layout of a keyboard onto a keypad in an electronic device as claimed in claim 2, wherein:
   in one segment of said segments, one key of said programmable keys is simultaneously associated with at least two characters; and
   said method further comprises selecting one character from said at least two characters by disambiguating a word currently being entered that includes either character of said at least two characters.

4. The method of mapping a layout of a keyboard onto a keypad in an electronic device as claimed in claim 2, wherein a set of icons is generated on a display in said device identifying said set of characters.

5. The method of mapping a layout of a keyboard onto a keypad in an electronic device as claimed in claim 4, wherein an alternative set of characters is associated with said programmable keys when an alternative layout key is activated.

6. The method of mapping a layout of a keyboard onto a keypad in an electronic device as claimed in claim 5, wherein an alternative set of icons is generated on a display in said device identifying said set alternative of characters when said alternative layout key is activated.

7. The method of mapping a layout of a keyboard onto a keypad in an electronic device as claimed in claim 6, wherein said navigation system provides wrapping of segments to non-adjacent segments that are located at edges of said map.

8. An electronic device comprising:
   a keypad having a set of a programmable keys in said keypad;
   data identifying a plurality of segments collectively mapping a QWERTY keyboard layout for said keypad;
   a keyboard navigation system having
      a left set of directional keys providing upper and lower navigation controls for said programmable keys when said set of characters are from a left column of segments in said collection of segments; and
      a right set of directional keys providing upper and lower navigation controls for said programmable keys when said set of characters are from a right column of segments in said collection of segments; and
   a mapping module system selectively associating characters in one segment of said plurality of segments to said programmable keys based on inputs provided to said navigation system,
   wherein said plurality of segments define rows having said left and right columns of segments of said QWERTY keyboard layout.

9. The electronic device as claimed in claim 8, wherein said navigation system utilizes navigation inputs from one of at least three directions from said set of characters to identify said another set of characters.

10. The electronic device as claimed in claim 9, wherein:
    in one segment of said plurality of segments, one key of said programmable keys is simultaneously associated with at least two characters; and
    an arbitrator module selects one character from said at least two characters by disambiguating a word currently being entered that includes either character of said at least two characters.

11. The electronic device as claimed in claim 10, wherein a set of icons is generated on a display in said device identifying said set of characters.

12. The electronic device as claimed in claim 11, wherein an alternative set of characters is associated with said programmable keys when an alternative layout key is activated.

13. The electronic device as claimed in claim 11, wherein an alternative set of icons is generated on said display in said device identifying said set alternative of characters when said alternative layout key is activated.

14. The electronic device as claimed in claim 8, wherein:
    said right set of directional keys provide access to a segment in said right column of said segments when said set of characters are from said left column of segments; and
    said left set of directional keys provide access to a segment in said left column of said segments when said set of characters are from said right column of segments.

15. The method of mapping a layout of a keyboard onto a keypad in an electronic device as claimed in claim 1, wherein:
    said right set of directional keys provide access to a segment in said right column of said segments when said set of characters are from said left column of segments; and
    said left set of directional keys provide access to a segment in said left column of said segments when said set of characters are from said right column of segments.

16. The electronic device as claimed in claim 9, wherein for said one segment, one row in said plurality of segments includes at least the characters "A", "S", "D" and "G".

17. The electronic device as claimed in claim 16, wherein said another set of characters are a second row in said plurality of segments including at least the characters "H", "J", "K" and "L" when a right directional key in said navigation system is activated.

18. The method of mapping a layout of a keyboard onto a keypad in an electronic device as claimed in claim 1, wherein for said one segment, one row in said plurality of segments includes at least the characters "A", "S", "D" and "G".

19. The method of mapping a layout of a keyboard onto a keypad in an electronic device as claimed in claim 16, wherein said another set of characters are a second row in said plurality of segments including at least the characters "H", "J", "K" and "L" when a right directional key in said navigation system is activated.

* * * * *